(12) United States Patent
Oki (10) Patent No.: US 8,491,968 B2
(45) Date of Patent: Jul. 23, 2013

(54) PROCESS FOR PRODUCTION OF FUNCTIONAL FILM

(75) Inventor: Kazuhiro Oki, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 227 days.

(21) Appl. No.: 12/933,304

(22) PCT Filed: Mar. 13, 2009

(86) PCT No.: PCT/JP2009/054918
§ 371 (c)(1),
(2), (4) Date: Sep. 17, 2010

(87) PCT Pub. No.: WO2009/116469
PCT Pub. Date: Sep. 24, 2009

(65) Prior Publication Data
US 2011/0014382 A1 Jan. 20, 2011

(30) Foreign Application Priority Data
Mar. 19, 2008 (JP) .................................. 2008-072182

(51) Int. Cl.
*B05D 3/02* (2006.01)

(52) U.S. Cl.
USPC ........................................ 427/372.2; 427/384

(58) Field of Classification Search
None
See application file for complete search history.

(56) References Cited

U.S. PATENT DOCUMENTS
2007/0047087 A1  3/2007  Fukuda et al.
2010/0315715 A1* 12/2010  Oki et al. ...................... 359/580

FOREIGN PATENT DOCUMENTS
JP    2000-114225  A    4/2000
JP    2003-164797  A    6/2003
JP    2007-86764   A    4/2007
JP    2007-176072  A    7/2007
JP    2007-260570  A   10/2007

OTHER PUBLICATIONS

Japanese Office Action issued in Japanese Patent Application No. 2008-072182 on Feb. 29, 2012.
International Search Report—dated Jun. 23, 2009 for PCT/JP2009/054918.
Price, Jr. et al., "Multicomponent Diffusion Theory and Its Applications to Polymer-Solvent Systems", AIChE Journal, Feb. 2003, vol. 49, No. 2, pp. 309-322.
Zielinski et al. "Predicting Polymer/Solvent Diffusion Coefficients Using Free-Volume Theory", AIChE Journal, Mar. 1992, vol. 38, No. 3, pp. 405-415.
International Preliminary Report on Patentability, dated Sep. 21, 2010, for Application No. PCT/JP2009/054918.

* cited by examiner

*Primary Examiner* — Erma Cameron
(74) *Attorney, Agent, or Firm* — Birch, Stewart, Kolasch & Birch, LLP (57) ABSTRACT

A process for production of a functional film comprises a coating liquid preparation step (12) of preparing a coating liquid; an application step (14) of applying a monolayer of the prepared coating liquid onto a substrate (18); and a drying step (16) of drying the applied coated layer. At the coating liquid preparation step (12), a plurality of solute materials are contained in at least one solvent; and when $D_{11}$ is a main diffusion coefficient of a solute material A having functionality of the plurality of solute materials A and B and $D_{22}$ is a main diffusion coefficient of the other solute material B, the other solute material B is selected so that an inequality A $D_{11}<D_{22}$ is satisfied; and at the drying step (16), the solute material A having functionality is unevenly distributed in the film surface.

10 Claims, 6 Drawing Sheets

CONSTITUTIVE EQUATION OF MASS TRANSFER OF THREE-COMPONENT SYSTEM $$\frac{\partial c_1}{\partial t} = \frac{\partial}{\partial z}\left(D_{11}\frac{\partial c_1}{\partial z}\right) + \frac{\partial}{\partial z}\left(D_{12}\frac{\partial c_2}{\partial z}\right)$$

$$\frac{\partial c_2}{\partial t} = \frac{\partial}{\partial z}\left(D_{22}\frac{\partial c_2}{\partial z}\right) + \frac{\partial}{\partial z}\left(D_{21}\frac{\partial c_1}{\partial z}\right)$$

$$\left(-D_{11}\frac{\partial c_1}{\partial z} - D_{12}\frac{\partial c_2}{\partial z}\right)\bigg|_{z=L(t)} = (1-c_1\bar{V}_1)k_g(p_{1i}^G - p_{1b}^G) - c_1\bar{V}_2 k_g(p_{2i}^G - p_{2b}^G)$$

$$\left(-D_{22}\frac{\partial c_2}{\partial z} - D_{21}\frac{\partial c_1}{\partial z}\right)\bigg|_{z=L(t)} = (1-c_2\bar{V}_2)k_g(p_{2i}^G - p_{2b}^G) - c_2\bar{V}_1 k_g(p_{1i}^G - p_{1b}^G)$$

$$\left(-D_{11}\frac{\partial c_1}{\partial z} - D_{12}\frac{\partial c_2}{\partial z}\right)\bigg|_{z=0} = 0$$

$$\left(-D_{22}\frac{\partial c_2}{\partial z} - D_{21}\frac{\partial c_1}{\partial z}\right)\bigg|_{z=0} = 0$$

$$\frac{dL}{dt} = -\bar{V}_1 k_g(p_{1i}^G - p_{1b}^G) - \bar{V}_2 k_g(p_{2i}^G - p_{2b}^G)$$

$$\ln\left(\frac{p_{1i}}{p_1^{vap}(T)}\right) = \ln\phi_1 + \left(1 - \frac{1}{n}\right)\phi_3 + \chi_{13}\phi_3^2 + \chi_{12}\phi_2^2 + \phi_2\phi_3(\chi_{13} + \chi_{12} - \chi_{23})$$

$$\ln\left(\frac{p_{2i}}{p_2^{vap}(T)}\right) = \ln\phi_2 + \left(1 - \frac{1}{n}\right)\phi_3 + \chi_{23}\phi_3^2 + \chi_{12}\phi_1^2 + \phi_1\phi_3(\chi_{12} + \chi_{23} - \chi_{13})$$

HEAT TRANSFER EQUATION $$(H\rho_b\hat{C}v_b + L(t)(c_p\hat{C}v_p + c_s\hat{C}v_s + c_{ns}\hat{C}v_{ns}))\frac{dT}{dt} =$$

$$h^G(T^G - T) + h^{SG}(T^{SG} - T) - \Delta H_{1,vap}k_g(p_{1i}^G - p_{1b}^G) - \Delta H_{2,vap}k_g(p_{2i}^G - p_{2b}^G)$$

FIG.7

| | D11 $\times 10^{-10} m^2/s$ | D12 $\times 10^{-10} m^2/s$ | D21 $\times 10^{-10} m^2/s$ | D22 $\times 10^{-10} m^2/s$ | D11−D22 $\times 10^{-10} m^2/s$ | D11−D22 −(D22−D12) $\times 10^{-10} m^2/s$ | SOLUTE A/(SOLUTE A + SOLUTE B) AMOUNT (FUNCTIONAL MATERIAL = PROPORTION OF SOLUTE A) | EVALUATION OF PERFORMANCE (HIGHER PROPORTION OF SOLUTE A IS BETTER) |
|---|---|---|---|---|---|---|---|---|
| COMPARATIVE EXAMPLE1 | 1 | 0 | 0 | 1 | 0 | 0 | 0.500 | PASSABLE |
| COMPARATIVE EXAMPLE2 | 2 | 0 | 0 | 1 | 1 | 1 | 0.444 | BAD |
| COMPARATIVE EXAMPLE3 | 4 | 0 | 0 | 1 | 3 | 3 | 0.421 | BAD |
| EXAMPLE1 | 1 | 0 | 0 | 2 | −1 | − | 0.556 | GOOD |
| EXAMPLE2 | 1 | 0 | 0 | 4 | −3 | − | 0.579 | GOOD |
| EXAMPLE3 | 1 | 0 | 0 | 10 | −9 | − | 0.591 | GOOD |
| COMPARATIVE EXAMPLE4 | 2 | 1 | 1 | 2 | 0 | 0 | 0.5 | PASSABLE |
| EXAMPLE4 | 2 | 1 | 0 | 2.5 | −0.5 | −0.5 | 0.528 | GOOD |
| EXAMPLE5 | 1 | −1 | 0 | 1.5 | −0.5 | −1.5 | 0.724 | GOOD |
| EXAMPLE6 | 1 | −3 | 0 | 1.5 | −0.5 | −3.5 | 0.901 | EXCELLENT |

PROCESS FOR PRODUCTION OF FUNCTIONAL FILM

This application was filed on Mar. 13, 2009, as PCT/JP2009/054918. The application claims priority under 35 U.S.C. §119 to Japanese priority application No. 2008-072182 filed on Mar. 19, 2008, the entire contents of which are hereby incorporated by reference.

TECHNICAL FIELD

The present invention relates to a process for production of a functional film, and particularly relates to a technique for applying a monolayer of a coating liquid of a multicomponent system comprising a plurality of solute materials and at least one solvent on a substrate, and unevenly distributing the solute materials having functionality at a step of drying the applied coated layer in a film surface.

BACKGROUND ART

Nowadays, various functional films having various functions, e.g., optical films for liquid crystal displays such as antireflection films, anti-glare films, and optical compensation films, special films containing a heat sensitive developing agent, nano particles, and the like, separator films for fuel cells, magnetic tapes containing a magnetic agent, adhesive tapes containing an adhesive, and barrier films containing a barrier material are used.

Such a functional film is produced by applying a monolayer of a coating liquid of a multicomponent system containing a solute material having functionality onto a flat substrate or a continuously conveyed sheet substrate made of a plastic, or a metal, or the like, drying only a solvent from the coated layer, and heating and solidifying the coated layer. In formation of such a functional film, if the solute material having function can be unevenly distributed in the film surface, there are merits of improvement in functionality and significant reduction in the amount of the functional material used.

On the other hand, in the case where the solute material having functionality is unevenly distributed in the film surface, it is also considered to perform coating several times to form a multilayer coating. However, there are problems that production cost increases compared with monolayer coating, but also that a desired function cannot be demonstrated because the final coating thickness is large.

Thus, if the functional solute material can be unevenly distributed with high precision in the film surface by drying the coated layer formed by the monolayer coating, quality and cost of the functional film can be significantly improved.

However, a state inside the coated layer often changes with drying conditions, and an extremely precise control technique is demanded in order to control the state inside the coated layer precisely at the drying step to unevenly distribute the functional solute material in the film surface.

For example, Patent Document 1 is an example in which a state inside a coated layer is controlled at a drying step, although it is not for unevenly distributing a functional solute material in the film surface. In description of Patent Document 1, simulation of a two-component system is conducted to find an optimal drying condition, and the drying condition is brought closer to the optimal drying condition to prevent formation of unique depressions and projections produced in a portion at an edge of a resist film.

Moreover, change of a diffusion coefficient according to change of a solvent concentration during drying is found in Non-Patent Document 1 or Non-Patent Document 2. Particularly, a free volume theory of Duda is also tried in part in the drying simulation.

Patent Document 1: Japanese Patent Application Laid-Open No. 2003-164797

Non-Patent Document 1: AIChE Journal March 1992, Vol. 38, No. 3, pp 405-415 Predicting Polymer/Solvent Diffusion Coefficients Using Free-Volume Theory, Zielinski. J. M. Estimation of a diffusion coefficient using the free volume theory.

Non-Patent Document 2: AIChE Journal February 2003, Vol. 49, No. 2, PP 309-322 Multicomponent Diffusion Theory and Its Applications to Polymer-Solvent System, Price P. E. et al.

DISCLOSURE OF THE INVENTION

Problems to be Solved by the Invention

However, the above-mentioned various functional films are often made of a coating liquid of a multicomponent system (for example, a three-component system of two solutes and one solvent) in which a plurality of solute materials are contained in not less than one solvents. Consequently, the drying condition thereof is different from the drying condition for the two-component system as those in Patent Document 1 or Non-Patent Documents 1 and 2. In addition, there is a problem that precise control of the drying condition to the optimal drying condition found in the drying simulation is actually difficult.

Moreover, a method for examining a diffusion coefficient of each solute included in the multicomponent system and making decision following conducting precise drying simulation can be considered. However, information on the diffusion coefficients other than those of general solvents and polymers is hardly known, and measurement of the diffusion coefficient has also been troublesome. For that reason, utilization of the diffusion coefficient may not been advanced. Additionally, in the case where a plurality of polymers are contained, research of the drying simulation itself is hardly conducted, and knowledge with respect to handling of the cross diffusion coefficient needed for calculation is hardly released.

On the other hand, examples of methods for unevenly distributing a functional solute material in a film surface without being dependent on control of the drying condition include a method for modifying a functional solute material with a hydrophobic group using a surface active agent or the like. However, the molecular structure of the functional solute material changes in this case. As a result, there is a problem that the functionality of the functional film originally expected is reduced.

From such a background, there is a demand for a process for production of a functional film in which a functional solute material can be unevenly distributed in a film surface without being dependent on control of the drying condition for the coated layer formed by monolayer coating and it is unnecessary to change the structure of the functional solute material.

The present invention was made in consideration of such circumstances, and an object of the present invention is to provide a process for production of a functional film in which a functional solute material can be unevenly distributed in a film surface without being dependent on control of the drying condition for the coated layer formed by monolayer coating and it is unnecessary to change the structure of the functional solute material.

Means for Solving the Problems

In order to achieve the object, a first aspect according to the present invention provides a process for production of a functional film, comprising the steps of: a coating liquid preparation step of preparing a coating liquid; an application step of applying a monolayer of the prepared coating liquid onto a substrate; and a drying step of drying the applied coated layer; wherein a plurality of solute materials are contained in at least one solvent; when $D_{11}$ is a main diffusion coefficient of a solute material having functionality of the plurality of solute materials and $D_{22}$ is a main diffusion coefficient of the other solute material, the other solute material is selected so that an inequality A $D_{11} < D_{22}$ is satisfied; and at the drying step, the solute material having functionality is unevenly distributed in the film surface.

Here, the film surface means a coated layer surface on the side not in contact with the substrate.

According to the process for production of a functional film according to the first aspect, at the coating liquid preparation step, the a plurality of solute materials are contained in the at least one solvent, and the other solute material is selected so that, for the relation between a main diffusion coefficient $D_{11}$ of a solute material having functionality of the plurality of solute materials and a main diffusion coefficient $D_{22}$ of the other solute material, an inequality A $D_{11} < D_{22}$ is satisfied.

Thereby, the functional solute material can be unevenly distributed in the film surface without being dependent on control of the drying condition for the coated layer formed by monolayer coating only by selecting the other solute material so that the inequality A is satisfied, without changing the structure of the functional solute material. Thereby, the quality and cost of the functional film produced can be significantly improved.

Selecting the other solute material so that the inequality A is satisfied includes changing the structure of the other solute material or the like. Moreover, in the case where one solute material having functionality and two other solute materials are used, this means selecting of the two other materials so that the inequality A is satisfied. This is true of the case where the number of the solute material is not less than four.

In order to achieve the object, a second aspect according to the present invention provides a process for production of a functional film, comprising: a coating liquid preparation step of preparing a coating liquid; an application step of applying a monolayer of the prepared coating liquid onto a substrate; and a drying step of drying the applied coated layer; wherein at the coating liquid preparation step, a plurality of solute materials are contained in at least one solvent; and when $D_{11}$ and $D_{12}$ are a main diffusion coefficient and a cross diffusion coefficient of a solute material having functionality of the plurality of solute materials, respectively, and $D_{22}$ and $D_{21}$ are a main diffusion coefficient and a cross diffusion coefficient of the other solute material, respectively, the other solute material is selected so that an inequality B $(D_{11}-D_{21}) < (D_{22}-D_{12})$ is satisfied; and at the drying step, the solute material having functionality is unevenly distributed in the film surface.

In the second aspect, the cross diffusion coefficient is also considered as well as the main diffusion coefficient, and the relationship between the solute material having functionality and the other solute material is specified.

According to the second aspect, at the coating liquid preparation step, the a plurality of solute materials are contained in the at least one solvent; and when $D_{11}$ and $D_{12}$ are a main diffusion coefficient and a cross diffusion coefficient of a solute material having functionality of the plurality of solute materials, respectively, and $D_{22}$ and $D_{21}$ are a main diffusion coefficient and a cross diffusion coefficient of the other solute material, respectively, the other solute material is selected so that an inequality B $(D_{11}-D_{21}) < (D_{22}-D_{12})$ is satisfied.

Thereby, the functional solute material can be unevenly distributed in the film surface without being dependent on control of the drying condition for the coated layer formed by monolayer coating only by selecting the other solute material so that the inequality B is satisfied, without changing the structure of the functional solute material. Thereby, the quality and cost of the functional film produced can be significantly improved.

Selecting the other solute material so that the inequality B is satisfied includes changing the structure of the other solute material or the like so that the inequality B is satisfied. Moreover, in the case where one solute material having functionality and two other solute materials are used, this means selecting of the two other materials so that the inequality B is satisfied. This is true of the case where the number of the solute material is not less than four.

According to a third aspect, in the process for production according to the first or second aspect, the solute material having functionality is a monomer or a polymer.

The third aspect specifies preferable functional solute materials used for the functional film.

According to a fourth aspect, in the process for production according to the first or third aspect, a difference between the diffusion coefficients represented by $D_{11}-D_{22}$ is not more than −3.

This is because it is much easier to unevenly distribute the solute material having functionality in the film surface at the drying step in the case where a difference between the diffusion coefficients represented by $D_{11}-D_{22}$ is not more than −3. Here, not more than −3 means that a degree of minus is 3 or larger.

According to a fifth aspect, in the process for production according to the second or third aspect, a difference between the diffusion coefficients represented by $(D_{11}-D_{21})-(D_{22}-D_{12})$ is not more than −1.5.

This is because it is much easier to unevenly distribute the solute material having functionality in the film surface at the drying step in the case where the difference between the diffusion coefficients represented by $(D_{11}-D_{21})-(D_{22}-D_{12})$ is not more than −1.5. Here, not more than −1.5 means that a degree of minus 1.5 or larger.

More preferably, the difference between the diffusion coefficients represented by $(D_{11}-D_{21})-(D_{22}-D_{12})$ is not more than −3.5.

The inequality A of the main diffusion coefficients of the solute material 1 and the solute material 2 is shown in the first aspect, and the inequality B when the main diffusion coefficient and the cross diffusion coefficient are considered is shown in the second aspect. Of course, both of the inequality A and the inequality B is satisfied. The diffusion coefficient often has concentration dependency and temperature dependency. Accordingly, in that case, change of the diffusion coefficient is preferably calculated and compared based on a temperature during drying and change in the concentration. Then, an average value of the diffusion coefficient that changes during drying may satisfy the inequality A or the inequality B.

Advantages of the Invention

As described above, according to the process for production of a functional film according to each aspect of the present invention, a functional solute material can be unevenly distributed in a film surface without being dependent on control of the drying condition for the coated layer formed by monolayer coating and it is unnecessary to change the structure of the functional solute material. Thereby, the quality and cost of the functional film produced can be significantly improved.

BRIEF DESCRIPTION OF THE DRAWINGS

FIG. 6 is a drawing showing a constitutive equation and a heat transfer equation of mass transfer in a drying simulation.

DESCRIPTION OF SYMBOLS

10 . . . Process for production of functional film, 12 . . . Coating liquid preparation step, 14 . . . Application step, 16 . . . Drying step, 18 . . . Transparent substrate, 20 . . . Antireflection film, 22 . . . Lower layer, 24 . . . Intermediate layer, 26 . . . Upper layer, 30 . . . FTIR apparatus, 32 . . . Sensor part, 40 . . . Manufacturing apparatus for antireflection film, Coater, 50A . . . Coating head, 54 . . . Initial drying zone, main drying zone

BEST MODE FOR CARRYING OUT THE INVENTION

Hereinafter, in accordance with the accompanying drawings, a preferable embodiment of a process for production of a functional film according to the present invention will be described in detail.

Figure 1:
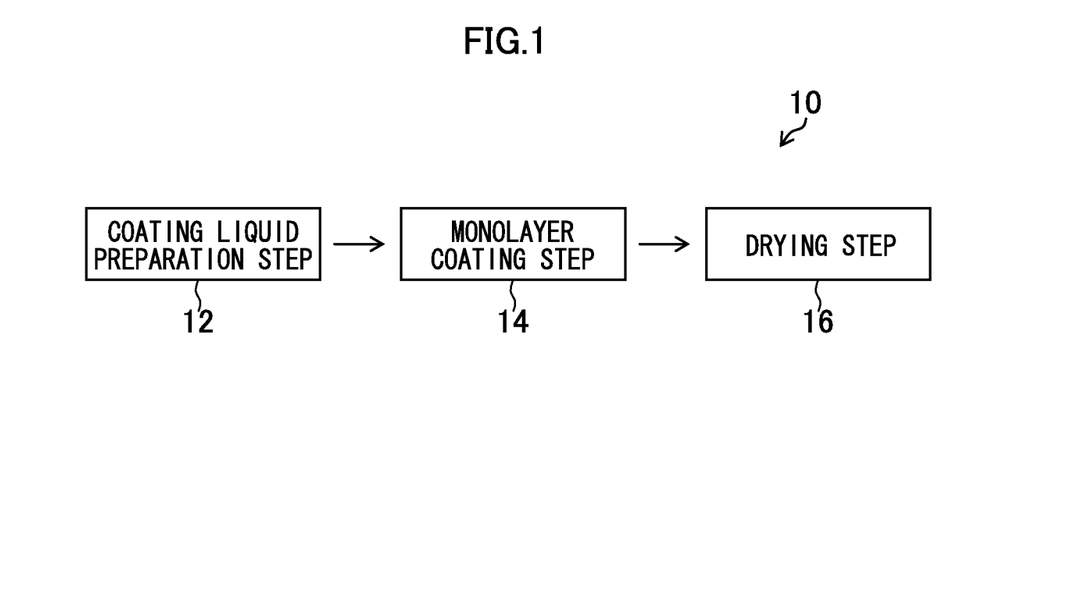
FIG. 1 is a process chart showing a process for production of a functional film according to the present invention.

As shown in FIG. 1, a process 10 for production of a functional film according to the present invention comprises a coating liquid preparation step 12 of preparing a coating liquid, an application step 14 of applying a monolayer of the prepared coating liquid onto a substrate, and a drying step 16 of drying the applied coated layer.

In the present embodiment, description will be made using an example in which a monolayer of the coating liquid of a three-component system of a solute material A made of a first polymer having functionality, a solute material B made of a second polymer serving as a binder, and one solvent C is applied onto a transparent substrate 18, and an antireflection film is produced by removing the solvent C from the applied monolayer of the coated layer by drying.

The process for production according to the present invention is not limited to production of the antireflection film, and can be applied to production of functional films having various functions, e.g., optical films for liquid crystal displays such as anti-glare films, and optical compensation films, special films containing a heat sensitive developing agent, nano particles, and the like, separator films for fuel cells, magnetic tapes containing a magnetic agent, adhesive tapes containing an adhesive, and barrier films containing a barrier material.

Figure 2:
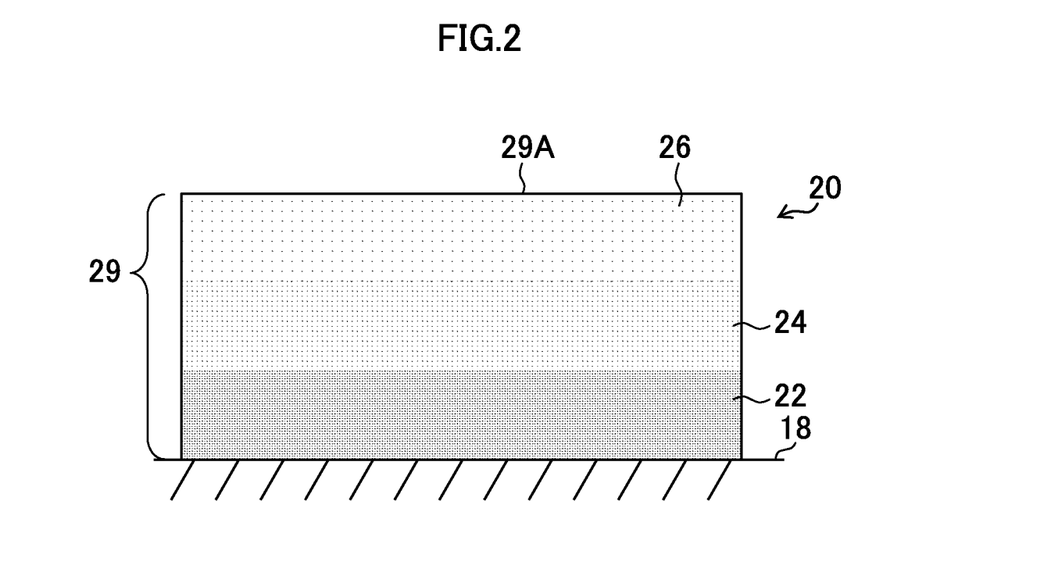
FIG. 2 is a conceptual diagram showing a state inside a coated layer of a functional film produced by the process for production of a functional film according to the present invention.

FIG. 2 is a cross sectional schematic view showing an example of an antireflection film in the present embodiment. As shown in FIG. 2, an antireflection film 20 produced by the process for production of a functional film according to the present invention is produced in the state where the solute material A made of the first polymer having functionality is unevenly distributed in the film surface, and the solute material B made of the second polymer is unevenly distributed on the transparent substrate 18 side. Namely, a lower layer 22 mainly made of the second polymer, an intermediate layer 24 having the first polymer and the second polymer intermingled approximately uniformly, and an upper layer 26 mainly made of the first polymer having functionality are formed on the transparent substrate 18 in this order from the transparent substrate 18 side. The lower layer 22, the intermediate layer 24, and the upper layer 26 are clearly divided into three layers and illustrated in FIG. 2. Practically, the layer changes gradationally such that from the transparent substrate 18 side to the film surface, the proportion of the concentration of the second polymer is gradually reduced, and the proportion of the concentration of the first polymer is gradually increased.

In order to unevenly distribute the solute material A made of the first polymer having functionality in the film surface as shown in FIG. 1, at the coating liquid preparation step 12, it is necessary to prepare a coating liquid in which the solute material A made of the first polymer having functionality and the solute material B made of the second polymer acting as a binder satisfy at least one of conditions of the following inequality A or inequality B.

The inequality A is D11<D22 when D11 is a main diffusion coefficient of a solute material 1 having functionality and D22 is a main diffusion coefficient of a solute material 2 as a binder.

The inequality B is (D11−D21)<(D22−D12) when D11 is a main diffusion coefficient of the solute material 1 having functionality, D12 is a cross diffusion coefficient thereof, D22 is a main diffusion coefficient of the solute material 2 as a binder, and D21 is a cross diffusion coefficient thereof.

Of course, both of the inequality A and the inequality B are satisfied. In this case, in order to satisfy at least one of the inequality A and the inequality B, it is important to determine (select) the solute material A having functionality first, and then, to select the kind of the solute material B or to change the structure of the solute material B in a relationship with the determined solute material A so that the main diffusion coefficient and cross diffusion coefficient of the other solute material B may satisfy the inequality A and/or the inequality B.

As a method for measuring the main diffusion coefficient of the solute material A and the solute material B, methods such as an inverse gas chromatography method (IGC) of Document 1, a Raman method of Document 2, and an NMR method of Document 3, are often used, as shown in the following documents. Moreover, in recent years, in measurement of the cross diffusion coefficient, which is difficult so far, the cross diffusion coefficient has been able to be also measured by measuring a three-component system using the Raman method. As shown in Document 4, measurement using a laser has been also possible.

Document 1 . . . Macromolecules, 20, 1564-1578 (1987) Pawlisch, C. A. "Measurement of Diffusion Coefficient with Inverse Phase Gas Chromatography (INVERSE GAS CHROMATOGRAPHY)".

Document 2 . . . AIChE Journal 49 (2), pp. 323-334 Bardow, A. Raman method Model-based measurement of diffusion using Raman spectroscopy.

Document 3 . . . Macromolecules, 26, 6841 (1993) Waggoner, R. A. "Measurement of Self-Diffusion Coefficient with NMR Magnetic Resonance Method".

Document 4 . . . Maiko Niwa (Graduate School of Keio University), Yasuyuki Yamamoto (National Institute of Advanced Industrial Science and Technology), Yuji Nagasaka (Keio University), "Development of a method for measurement of diffusion coefficient of a three-component polymer solution using a Soret effect", Kagaku Kogakkai Shuki Taikai Kenkyu Happyo Koenshu (Abstracts of Autumn Meeting of Society of Chemical Engineers, Japan), Vol. 39th Page. J221 (2007 Aug. 13).

Then, a monolayer of the coating liquid having at least one of the above-mentioned relationships of the inequality A and the inequality B is applied onto the transparent substrate 18 at the monolayer application process 14, and the applied monolayer coated layer is dried at the drying step 16. Thereby, in the drying process at the drying step 16, the internal state inside the coated layer changes so that the solute material A is unevenly distributed in the film surface. Namely, the main diffusion coefficients (and cross diffusion coefficients) of the solute material A and the solute material B within the coated layer satisfy at least one of the above-mentioned inequality A and inequality B so that the solute material A is unevenly distributed toward the film surface side, and the solute material B is unevenly distributed toward the transparent substrate 18 side according to easiness (largeness of the diffusion coefficient) of diffusion movement of the solute material A and the solute material B, which is produced within the coated layer during drying, as shown in FIG. 2.

Figure 3:
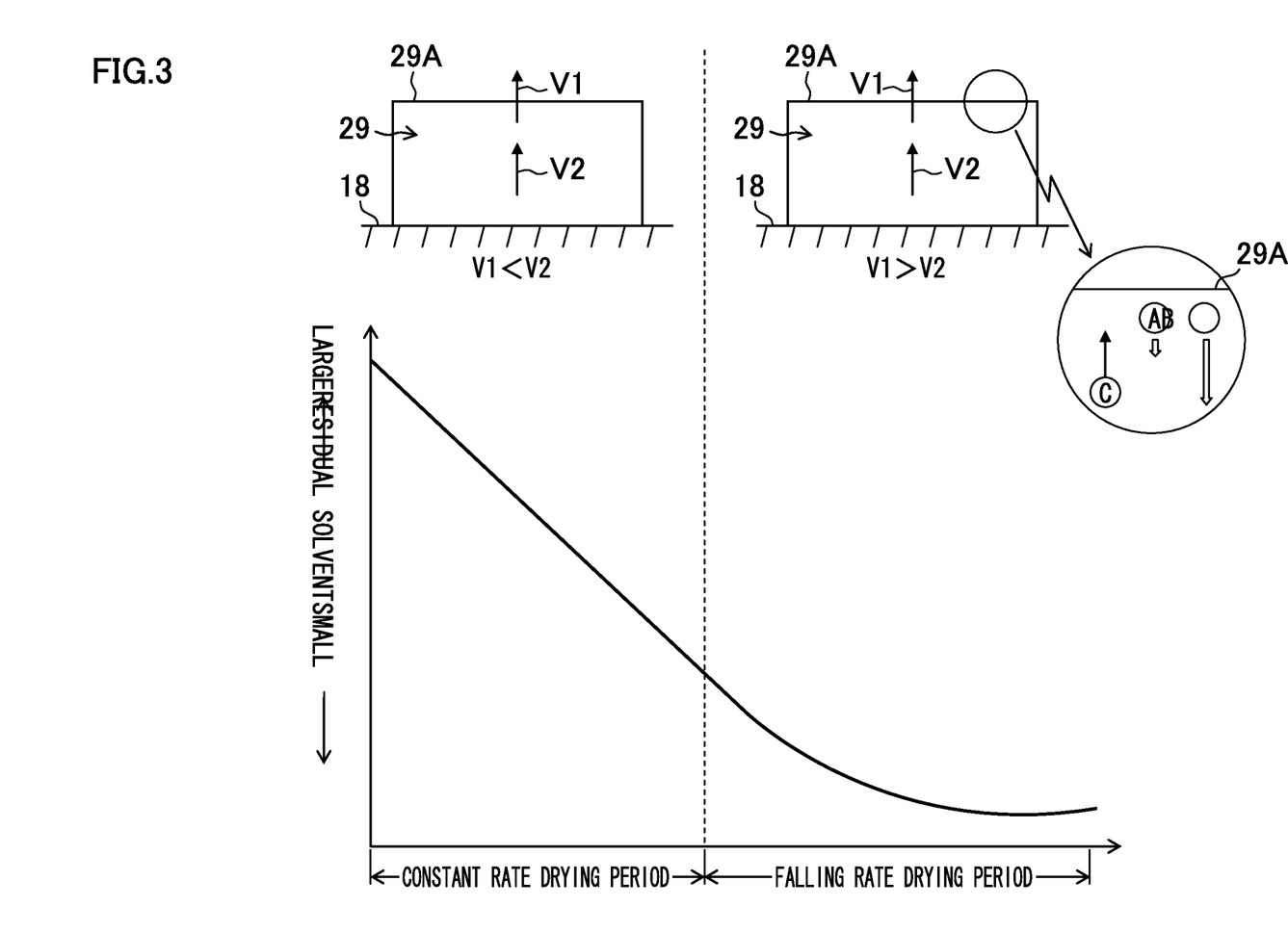
FIG. 3 is an explanatory view conceptually illustrating a mechanism of the process for production of a functional film according to the present invention.

A mechanism that the solute material A is unevenly distributed in the film surface at the drying step will be described in detail using a conceptual diagram of FIG. 3. In FIG. 3, reference character A designates the solute material A having functionality, reference character B designates the solute material B acting as a binder, and reference character C designates the solvent C. The left side of the conceptual diagram in FIG. 3 shows a behavior of the solute material A and the solute material B in the coated layer 29 (particularly, a surface layer portion of the coated layer 29) for a constant rate drying period. The right side of the conceptual diagram therein shows a behavior of the solute material A and the solute material B in the coated layer 29 for a falling rate drying period.

First, for the constant rate drying period, i.e., at an early stage of drying, the amount of the solvent in the coated layer 29 is linearly reduced. In short, it means that the solvent C vaporizes at a constant rate from the coating layer surface 29A (it is the same as the film surface). A rate V2 at which the solvent C diffuses within the coated layer 29 (referred to as internal diffusion) is larger than a rate V1 at which the solvent C diffuses from the liquid phase (coated layer) side to the gaseous phase (air) side on the coating layer surface 29A (referred to as surface diffusion). Thereby, by the internal diffusion within the coated layer 29, the amount of the solvent C to be decreased in the coating layer surface 29A along with vaporization (as molecules of the solvent C move from the liquid phase to the gaseous phase side) is made up at a sufficient rate such that the surface diffusion is not reduced. For this constant rate drying period, the concentration of the solute material A and that of the solute material B in the liquid phase in the vicinity of the coating layer surface 29A tend to increase. However, change in the proportion of the solute material A and the solute material B is small, and a phenomenon in which a larger amount of one solute is unevenly distributed in the coated layer 29 is not produced; or the change is small even if the phenomenon is produced.

When drying progresses, the constant rate drying period shifts to the falling rate drying period through a transition period. In short, the rate at which the solvent C vaporizes from the coating layer surface 29A (it is the same as the film surface) is gradually reduced.

The concentration of the solute material A and that of the solute material B in the coated layer 29 vaporize with progression of drying. Then, the rate at which the solvent C diffuses in the coated layer 29 is reduced and becomes slower than the rate at which the solvent C diffuses toward the gaseous phase side on the coating layer surface 29A (referred to as the surface diffusion). Thereby, the amount of the solvent C made up by diffusion within the coated layer 29 (referred to as the internal diffusion) no longer meets the amount of the solvent C to be decreased in the coating layer surface 29A along with vaporization (as molecules of the solvent C move from the liquid phase to the gaseous phase side).

Thus, the solute concentration within the coated layer 29 increases along with drying, and the solute concentration of the coating layer surface 29A becomes larger than that within the coated layer 29. At this time, easiness of diffusion (largeness of the diffusion coefficient) of the solute material A and the solute material B causes a large difference between the behavior of the solute material A and that of the solute material B within the coated layer 29.

Namely, in the case where the concentrations of the solute materials A and B in the vicinity of the coating layer surface 29A are larger than those within the coated layer 29, each of the solute materials A and B diffuses in the thickness direction of the coated layer 29 so that a difference in the concentration is reduced. At this time, when the diffusion coefficients of the solute materials A and B are the same value, the solute materials A and B move in the same proportion. Accordingly, the proportion of the solute concentrations in the vicinity of the coating layer surface 29A is kept constant. However, practically, the diffusion coefficients are often different when the kinds of the solute are different, and the solute material A having a small diffusion coefficient slowly moves from the coating layer surface 29A to the inside of the coated layer 29. For this reason, a larger amount of the solute material A remains (is left) in the coating layer surface 29A than the solute material B having a large diffusion coefficient does. In an enlarged view of the coating layer surface 29A in FIG. 3, a difference in largeness between the diffusion coefficient of the solute material A and that of the solute material B is shown by the length of arrows, and it means that the diffusion coefficient is larger as the arrow is longer. Thereby, the solute material B diffuses in a larger amounts than the solute material A and moves in the direction of the transparent substrate. Then, as shown in FIG. 2, the coated layer 29 when drying is completed is formed into a film 20 in which a larger amount of the solute material A is unevenly distributed in the coating layer surface 29A.

In this case, strictly, the diffusion coefficients of the solute material A and that of the solute material B during drying change according to the concentration of the solute material A and that of the solute material B in the solvent. However, the average value of the diffusion coefficients that change during drying may satisfy at least one relationship of the above-mentioned inequality A and inequality B.

The drying rate of the solvent C at the drying step 16 can be adjusted by a drying air velocity, a drying temperature, and the like. Moreover, the drying rate is preferably 0.03 to 5 g/m2/s. At an excessively slow drying rate, the solvent may excessively permeate the transparent substrate 18 to cause deformation of the transparent substrate 18 or the like. Conversely, at an excessively fast drying rate, the viscosity of the coated layer 29 is drastically increased. For that reason, the coated layer 29 solidifies before the solute material B fully diffuses and moves, making it hard to unevenly distribute the solute material A in the coating layer surface 29A in a high concentration. Moreover, at an excessively fast drying rate, the quality of the surface state or the like may deteriorate due to uneven drying.

Figure 4:
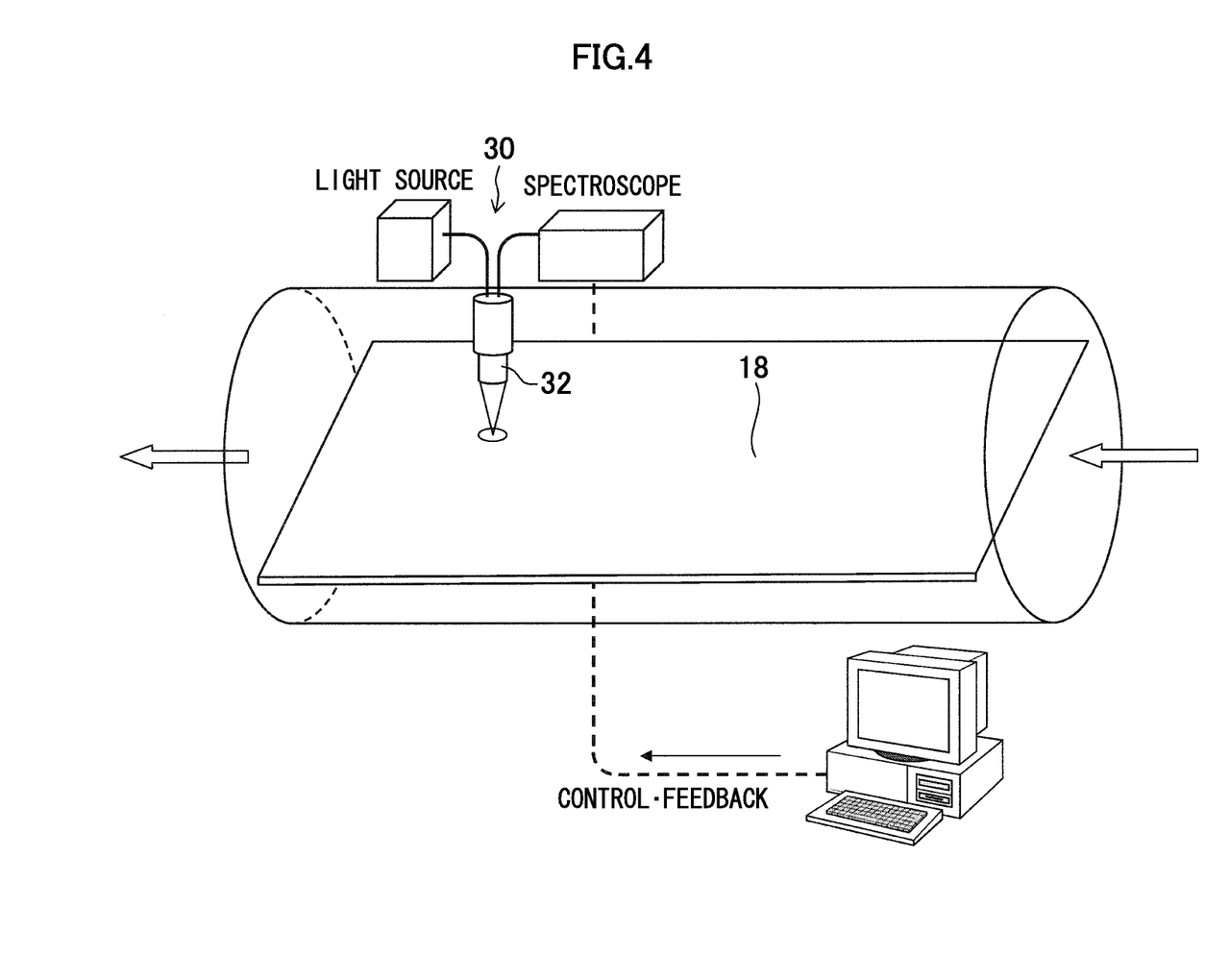
FIG. 4 is an explanatory view showing a microscope Raman measuring apparatus for measuring a drying rate of a solvent.

The drying rate can be measured with a portable type FTIR apparatus 30 as shown in FIG. 4, for example. Namely, as shown in the drawing, using the portable type FTIR apparatus 30 including a sensor part 32 made of fibers, change over time in the amount of the solvent vaporized within the coated layer accompanied by drying is examined from absorbance variation from an upper portion of the coated layer of the transparent substrate 18 traveling in an arrow direction. As such an FTIR apparatus, a VIR-9500 (JASCO Corporation) can be used, for example.

In the process for production of the antireflection film, a heat or photopolymerizable component (particularly, a polyfunctional curing monomer and/or oligomer) may be used to form the coated layer 29, and subsequently polymerized and cured by irradiation with an active energy line (ultraviolet rays, electron beams, and the like) or heating.

Moreover, the thickness of the coated layer 29 applied onto the transparent substrate 18 (dry film thickness) is preferably 1 to 500 μm, and more preferably 5 to 200 μm. Moreover, as the antireflection film 20, thin films such as a hard-coat layer and an antistatic layer (for example, a conductive thin film made of a light curable resin containing a conducting agent and a hydrophilic component) may be formed when necessary.

Next, various materials that form the antireflection film 20 will be described.

A light transmittance of the transparent substrate 18 is preferably not less than 80%, and more preferably not less than 86%. A haze of the transparent substrate is preferably not more than 2.0%, and more preferably not more than 1.0%. A refractive index of the transparent substrate 18 is preferably from 1.4 to 1.7. Use of a plastic film is also preferable. Examples of a material for the plastic film include cellulose esters, polyamides, polycarbonates, polyesters (e.g., polyethyleneterephthalates, polyethylenenaphthalates, and the like), polystyrenes, polyolefins, polysulfones, polyethersulfones, polyarylates, polyetherimides, polymethylmethacrylates, and polyether ketones.

The solute material A and the solute material B used for the present embodiment are not particularly limited, and a thermoplastic resin is usually used. As the solute material A having functionality, a monomer or a polymer can be used suitably.

Examples of the thermoplastic resin can include styrenic resins, (meth)acrylic resins, organic acid vinylester based resins, vinyl ether based resins, halogen containing resins, olefin based resins (including alicyclic olefin based resins), polycarbonate based resins, polyester based resins, polyamide based resins, thermoplastic polyurethanes, polysulfone based resins (polyether sulfones, polysulfones, and the like), polyphenylene ether based resins (polymers of 2,6-xylenol, and the like), cellulose derivatives (cellulose esters, cellulose carbamates, cellulose ethers, and the like), silicone resins (polydimethylsiloxanes, polymethylphenylsiloxanes, and the like), rubbers and elastomers (diene based rubbers such as polybutadiene and polyisoprene, styrene-butadiene copolymers, acrylonitrile-butadiene copolymers, acrylic rubbers, urethane rubbers, silicone rubbers, and the like). Not less than two kinds of these thermoplastic resins can be used in combination.

As the (meth)acrylic resins, a (meth)acrylic monomer alone or a copolymer thereof can be used, or a copolymer of a (meth)acrylic monomer and a copolymerizable monomer can be used, for example. Examples of the (meth)acrylic monomer can include (meth)acrylic acids; C1-10 alkyl(meth) acrylates such as methyl(meth)acrylates, ethyl(meth)acrylates, butyl(meth)acrylates, t-butyl(meth)acrylates, isobutyl (meth)acrylates, hexyl(meth)acrylates, octyl(meth)acrylates, 2-ethylhexyl (meth)acrylates; aryl(meth)acrylates such as phenyl(meth)acrylates; hydroxyalkyl (meth)acrylates such as hydroxyethyl(meth)acrylates and hydroxypropyl (meth) acrylates; glycidyl(meth)acrylates; N,N-dialkylaminoalkyl (meth)acrylates; (meth)acrylonitriles; (meth)acrylates having an alicyclic hydrocarbon group such as tricyclodecane. Examples of the copolymerizable monomer can include the styrenic monomers, vinyl ester based monomers, maleic acid anhydrides, maleic acid, and fumaric acid. These monomers can be used alone, or not less than two kinds thereof can be used in combination.

Examples of the (meth)acrylic resins include poly(meth) acrylic acid esters such as polymethyl methacrylates, methyl methacrylate-(meth)acrylate copolymers, methyl methacrylate-(meth)acrylic acid ester copolymers, methyl methacrylate-acrylic acid ester-(meth)acrylate copolymers, and (meth) acrylic acid ester-styrene copolymers (e.g., MS resins). Preferable examples of the (meth)acrylic resins include C1-6 alkyl poly(meth)acrylates such as polymethyl(meth)acrylates, and particularly methyl methacrylate based resins mainly containing methyl methacrylate (50 to 100% by weight, and preferably approximately 70 to 100% by weight).

Of the cellulose derivatives, examples of cellulose esters can include aliphatic organic acid esters (e.g., cellulose acetates such as cellulose diacetate and cellulose triacetate; and C1-6 organic acid esters such as cellulose propionate, cellulose butyrate, cellulose acetate propionate, and cellulose acetate butylate), aromatic organic acid esters (C7-12 aromatic carboxylate esters such as cellulose phthalate and cellulose benzoate), and inorganic acid esters (e.g., cellulose phosphate, cellulose sulfate). Mixed acid esters such as acetic acid/nitric acid cellulose esters may also be used.

Examples of the cellulose derivatives also include cellulose carbamates (e.g., cellulose phenyl carbamate), and cellulose ethers (e.g., cyanoethyl cellulose; hydroxy C2-4 alkyl celluloses such as hydroxyethyl cellulose and hydroxypropyl cellulose; C1-6 alkyl celluloses such as methyl cellulose and ethyl cellulose; carboxymethyl cellulose and salts thereof, benzyl cellulose, and acetyl alkyl cellulose).

As a preferable thermoplastic resin, a resin that is non-crystalline and can be dissolved in an organic solvent (a common solvent that particularly can dissolve a plurality of polymers and curable compounds) is usually used. Resins having high moldability or film forming properties, transparency, and weatherability such as styrenic resins, (meth) acrylic resins, alicyclic olefin based resins, polyester based resins, cellulose derivatives (e.g., cellulose esters) are particularly preferable. Particularly, cellulose derivatives are preferable as the thermoplastic resin.

Moreover, from a viewpoint of abrasion resistance after curing, for example, a polymer having a functional group that is involved in a curing reaction (a functional group that can be reacted with a curing agent) can also be used as one polymer of polymers not compatible with each other. Examples of such a functional group include condensable or reactive functional groups (e.g., a hydroxyl group, an acid anhydride group, a carboxyl group, an amino group, an imino group, an epoxy group, a glycidyl group, an isocyanate group), polymerizable functional groups (e.g., C2-6 alkenyl groups such as vinyl, propenyl, isopropenyl, butenyl, and allyl; C2-6 alkynyl groups such as ethynyl, propynyl, and butynyl; C2-6 alkenylidene groups such as vinylidene; or functional groups having these polymerizable functional groups (e.g., a (meth) acrylyl group).

In the present embodiment, for example, in the case where the solute material B made of a second polymer is a cellulose derivative (for example, cellulose esters such as cellulose acetate propionate) and the solute material A made of a first polymer is an acrylic resin, preferably, a mass ratio of the first polymer and the second polymer is approximately 1:3 to 1:10, for example. Instead of a plurality of polymers, a polymer and a monomer can also be used in combination.

For example, specific examples of a material for an acrylate monomer include pentaerythritol triacrylate and dipentaerythritol hexaacrylate.

A curable compound that can be used is various curable compounds that are compounds having a functional group that reacts with a heat ray, an active energy line (e.g., ultraviolet rays, electron beams) or the like, and that can be cured or crosslinked with heat, an active energy line, or the like to form a resin (particularly, a curing or crosslinking resin).

Examples of the curable compound include thermosetting compounds or resins [low molecular weight compounds having an epoxy group, an isocyanate group, an alkoxy silyl group, a silanol group, polymerizable groups (e.g., a vinyl group, an allyl group, a (meth)acrylyl group) (and prepolymers, e.g., low molecular weight resins such as epoxy based resins, unsaturated polyester based resins, urethane based resins, and silicone based resin)]; and light curable compounds that can be cured with an active ray (e.g., ultraviolet rays) (ultraviolet ray curable compounds such as light curable monomers, oligomers, and prepolymers). The light curable compound may be EB (electron beam) curable compounds. The light curable compounds, such as light curable resins that may be the light curable monomers, oligomers, and low molecular weight resins, may be simply referred to as a "light curable resin." The curable compounds can be used alone, or not less than two kinds thereof can be used in combination.

The light curable compound usually has a light curable group, for example, a polymerizable group (e.g., a vinyl group, an allyl group, a (meth)acrylyl group) or a photosensitive group (e.g., a cinnamoyl group), and the light curable compounds having a polymerizable group (for example, monomers, oligomers (or resins, and particularly low molecular weight resins)) are particularly preferable.

Of the light curable compounds having a polymerizable group, examples of the monomer include monofunctional monomers [(meth)acrylic monomers such as (meth)acrylic acid esters, for example, alkyl(meth)acrylates (C1-6 alkyl (meth)acrylates such as methyl(meth)acrylate), cycloalkyl (meth)acrylates, (meth)acrylates having a crosslinked cyclic hydrocarbon group (e.g., isobornyl(meth)acrylate, adamantyl (meth)acrylate), and glycidyl(meth)acrylates; and vinyl esters such as vinyl acetate, and vinyl based monomers such as vinyl pyrrolidone], and polyfunctional monomers having at least two polymerizable unsaturated bonds [alkylene glycol di(meth)acrylates such as ethylene glycol di(meth)acrylate, propylene glycol di(meth)acrylate, butanediol di(meth) acrylate, neopentyl glycol di(meth)acrylate, and hexanediol di(meth)acrylate; (poly)oxy alkylene glycol di(meth)acrylates such as diethylene glycol di(meth)acrylate, dipropylene glycol di(meth)acrylate, and polyoxy tetramethylene glycol di(meth)acrylate; di(meth)acrylates having a crosslinked cyclic hydrocarbon group such as tricyclodecane dimethanol di(meth)acrylate and adamantane di(meth)acrylate; polyfunctional monomers having approximately 3 to 6 polymerizable unsaturated bonds such as trimethylolpropane tri (meth)acrylate, trimethylolethane tri(meth)acrylate, pentaerythritol tri(meth)acrylate, pentaerythritol tetra(meth) acrylate, and dipentaerythritol penta(meth)acrylate].

The curable compound may be used in combination with a curing agent according to the kind of the curable compound. For example, the light curable compound can be used in combination with a photopolymerization initiator.

Examples of the photopolymerization initiator that can be used include acetophenones, propiophenones, benzyls, benzoins, benzophenones, thioxanthones, and acyl phosphine oxide. The content of the photopolymerization initiator can be approximately 0.1 to 20 parts by weight based on the curable compound.

Uneven distribution properties of each solute material attributed to different main diffusion coefficients and cross diffusion coefficients of a plurality of solute materials can be evaluated by analyzing a dried film after a homogeneous solution is prepared using good solvents to both components, respectively and the solvents are vaporized. For example, performance of the functional material such as optical properties may be measured directly, or the amount of the material unevenly distributed may be analyzed focusing on the structure of molecules. Examples of methods for analyzing focusing on the structure of molecules include methods using an ESCA (Electron Spectroscopy for Chemical Analysis), a TOF-SIMS (Time-of-Flight Secondary Ion Mass Spectroscopy), and the like. A suitable method may be selected according to the kind and combination of the solute material A and the solute material B.

The above-mentioned solvent may be any solvent that dissolves at least two kinds of the plurality of polymers. Namely, the solvent can be properly selected according to kinds of the polymer, polymerizable components, and the like. As such a solvent, in the case of a mixed solvent, at least one kind thereof may be any solvent that can uniformly dissolve the solid content (the plurality of polymers, the curable compound, the reaction initiator, and other additives). Examples thereof include ketones (e.g., acetone, methyl ethyl ketone, methyl isobutyl ketone, cyclohexanone); ethers (e.g., dioxane, tetrahydrofuran); aliphatic hydrocarbons (e.g., hexane); alicyclic hydrocarbons (e.g., cyclohexane); aromatic hydrocarbons (e.g., toluene, xylene); halocarbons (e.g., dichloromethane, dichloroethane); esters (e.g., methyl acetate, ethyl acetate, butyl acetate); water; alcohols (e.g., ethanol, isopropanol, butanol, cyclohexanol); cellosolves (e.g., methyl cellosolve, ethylcellosolve); cellosolve acetates; sulfoxides (e.g., dimethyl sulfoxide); and amides (dimethyl formamide, dimethyl acetamide). These solvents can be used alone, or not less than two kinds thereof can be in combination.

Next, a process for production of an antireflection film including a coated layer structure according to the present embodiment will be described. An example is used in which a solution containing the solute materials A and B made of the two polymers described above, the solvent C that dissolves these polymers, and a curable compound is used as a coating liquid for an antireflection layer.

Figure 5:
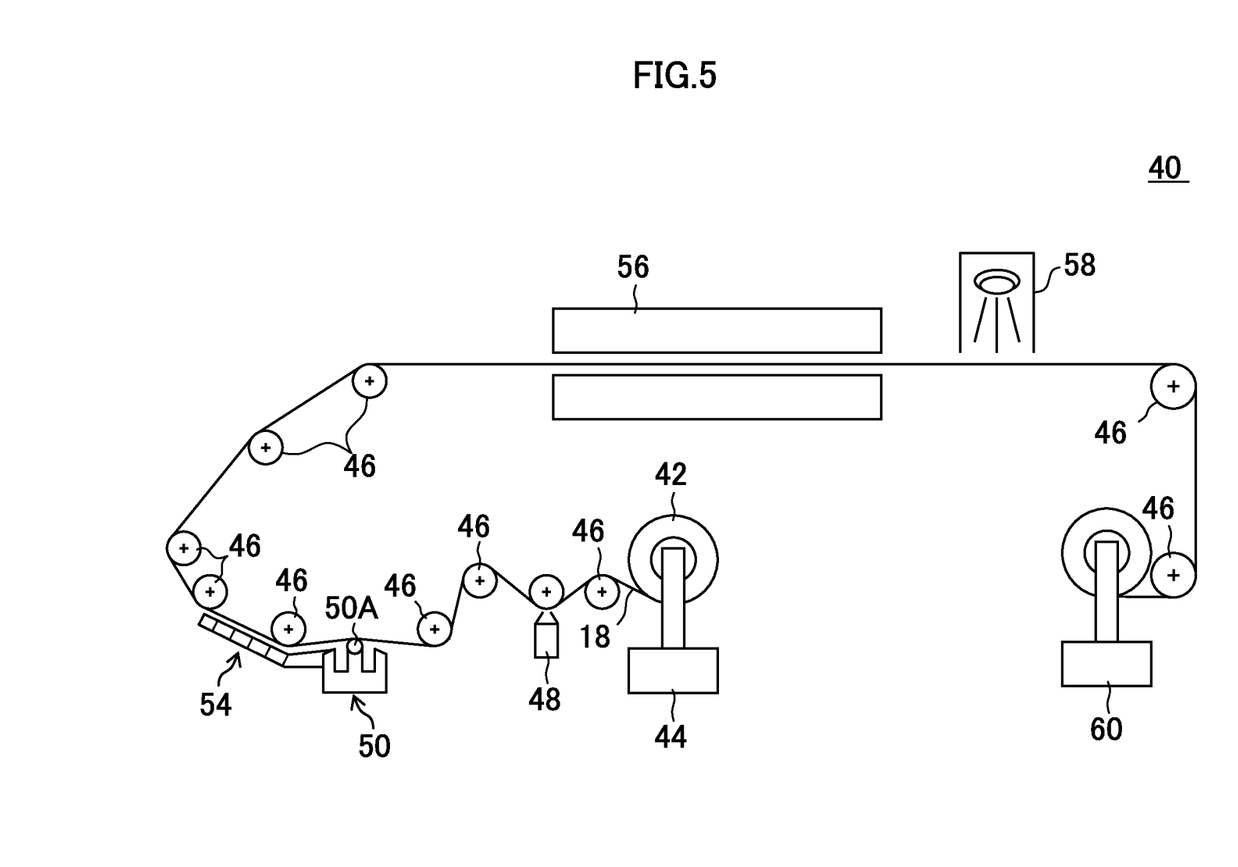
FIG. 5 is a conceptual diagram exemplifying a production process of an antireflection film in the present embodiment.

FIG. 5 is a schematic view showing an example of a production step 40 of the antireflection film according to the present embodiment.

A long transparent substrate 18 (including those having a certain functional layer already formed) is fed from a film roll 42 by a feeder 44.

The transparent substrate 18 is guided by a guide roller 46, and is fed to a dust remover 48. The dust remover 48 can remove dust adhering to the surface of the transparent substrate 18. A coating head 50A of an extrusion type coater 50 as application means is provided downstream of the dust remover 48 so that a monolayer of a coating liquid for an antireflection layer can be applied onto the transparent substrate 18 wound around a backup roller. A coated layer can have a wet thickness of not more than 40 μm, for example.

As a coating method, a dip coating method, an air knife coating method, a curtain coating method, a slide coating method, a roller coating method, a wire bar coating method, a gravure coating, a micro gravure method, and the like can be used. The coating head 50A may be installed in a pure atmosphere such as a clean room. At that time, cleanliness is preferably not more than class 1000, more preferably not more than class 100, and still more preferably not more than class 10.

An (initial) drying zone 54 that produces uneven distribution of the solute material having functionality in the present embodiment and a heating (main drying) zone 56 are sequentially provided downstream of the coating head 50A. Preferably, in the (initial) drying zone 54, the solvent is vaporized under suppression while the surface of the formed coated layer is sealed with a gaseous layer to vaporize most of the solvent. Subsequently, the coated layer is further dried in the heating (main drying) zone 56.

Using the difference between the diffusion coefficients (main diffusion coefficients, cross diffusion coefficients) of the solute material A and the solute material B, uneven distribution of the solute material A in the film surface according to the mechanism mentioned above is produced in this drying zone 54 at the time of vaporizing the solvent from the coated layer of the coating liquid for antireflection at a predetermined temperature (for example, room temperature of 25° C.).

A drying speed is preferably 0.03 to 5.0 g/m2/s because an excessively fast drying speed causes the coating liquid to be dried and solidified before uneven distribution is produced. As for the drying temperature, however, other than room temperature of 25° C. mentioned above, drying may be performed at a temperature of approximately 40 to 120° C. according to the boiling point of the solvent, for example. The amount of the drying air can be approximately 1 to 20 m/min., for example.

As for sealing of the gaseous layer on the surface of the coating layer in the drying zone 54, the gas is preferably moved along the surface of the coated layer so as to have a relative speed of −0.1 to 0.1 m/s with respect to the traveling speed of the coated layer. In order to vaporize the solvent under suppression, drying is preferably performed within a period of time when the decreasing speed of the solvent content in the coated layer is proportional to time. As for drying, a cover is preferably attached. For the drying air, adjusted air or uniform air may be used. Alternatively, the vaporized solvent may be condensed with a cooling condensation plate provided facing the coated layer to be removed.

The heating (main drying) zone 56 is not limited in particular, and a hot air heating apparatus (for example, a thermal treatment apparatus described in Japanese Patent Application Laid-Open No. 2001-314799), a heater heating apparatus, and the like can be used. In the case where hot air heating is performed, the air speed of the hot air is preferably not more than 1 m/s in order to suppress heating unevenness.

Downstream of the drying step, as a step of curing the coated layer, the coated layer is cured or crosslinked by a heat ray or an active energy line (e.g., ultraviolet rays, electron beams). A curing method can be selected according to a kind of the curable compound. For example, an ultraviolet ray irradiating apparatus 58 is used. Desired curing or crosslinking can be formed by this ultraviolet ray irradiation.

A heat treating zone for curing with heat may be provided depending on a material to perform desired curing or crosslinking. Alternatively, after the transparent substrate 18 having the formed coated layer is taken up, oven heating or heat treatment by conveying the transparent substrate 18 may be performed at a separated step. Then, the transparent substrate 18 having the antireflection film formed is taken up by a winder 60 provided downstream thereof.

As described above, by using the process for production of a functional film according to the present invention, the coated layer in which the solute material A having functionality is unevenly distributed in the film surface can be easily formed by one coating. Thereby, an antireflection film provided with light interference layers each having a different refractive index can be manufactured with good productive efficiency.

In the present embodiment, description has been made using an example in which the solution prepared by dissolving the two polymers in the solvent is used. However, a solution prepared by dissolving a plurality of polymers not less than three polymers (or monomers) in a solvent can be used.

In a preferable embodiment of the antireflection film described below, the functional film according to the present invention can form an arbitrary combination of an anti-glare layer, a low refractive index layer, a middle refractive index layer, and a high refractive index layer.

Namely, an antireflection layer composed of a monolayer to several layers of light interference layers on the transparent substrate is provided on the topmost surface of the antireflection film, and a hard-coat layer and an anti-glare layer are provided between the transparent substrate and the light interference layer when necessary. Of the multilayer films having the above-mentioned combination, the one including both the anti-glare layer and the antireflection layer is called an anti-glare antireflection film.

The anti-glare antireflection film having a layer structure in which an anti-glare layer and a low refractive index layer are laminated on the transparent substrate is designed so as to have a refractive index that satisfies below. Refractive index of anti-glare layer>refractive index of low refractive index layer. A hard-coat layer may also be provided between the transparent substrate and the anti-glare layer. A haze of the antireflection film preferably has a haze suitable for the anti-glare layer. Moreover, strength of the film is preferably not less than H in a pencil hardness test in accordance with JIS K5400, and more preferably not less than 2 H, and most preferably not less than 3 H.

A clear type antireflection film having a layer structure in which a hard-coat layer is provided on the transparent substrate and a low refractive index layer is laminated is designed so as to have a refractive index that satisfies below. Refractive index of anti-glare layer>refractive index of low refractive index layer. The hard-coat layer may also be provided between the transparent substrate and the anti-glare layer. A haze of the antireflection film is preferably not more than 5%, and more preferably not more than 3%. Moreover, strength of the film is preferably not less than H in a pencil hardness test in accordance with JIS K5400, and more preferably not less than 2 H, and most preferably not less than 3 H.

Alternatively, an anti-glare antireflection film having a layer structure in which an anti-glare layer is provided on the transparent substrate and a high refractive index layer and a low refractive index layer are laminated is designed so as to have a refractive index that satisfies below. Refractive index of high refractive index layer>refractive index of transparent substrate>refractive index of low refractive index layer. A haze of the antireflection film preferably has a haze suitable for the anti-glare layer. Moreover, strength of the film is preferably not less than H in a pencil hardness test in accordance with JIS K5400, and more preferably not less than 2 H, and most preferably not less than 3 H.

Alternatively, an anti-glare antireflection film having a layer structure in which a hard-coat layer is provided on the transparent substrate and a high refractive index layer and a low refractive index layer are laminated is designed so as to have a refractive index that satisfies below. Refractive index of high refractive index layer>refractive index of transparent substrate>refractive index of low refractive index layer. A haze of the antireflection film is preferably not more than 5%, and more preferably not more than 3%. Moreover, strength of the film is preferably not less than H in a pencil hardness test in accordance with JIS K5400, and more preferably not less than 2 H, and most preferably not less than 3 H.

[High Refractive Index Layer and Middle Refractive Index Layer]

The refractive index of the high refractive index layer is usually from 1.70 to 2.20. The thickness of the high refractive index layer is preferably from 5 nm to 10 μm, and more preferably from 10 nm to 1 μm. The refractive index of the middle refractive index layer is adjusted so as to be a value between the refractive index of the low refractive index layer and the refractive index of the high refractive index layer. The refractive index of the middle refractive index layer is preferably from 1.50 to 1.70.

[Low Refractive Index Layer]

The low refractive index layer is formed by sequentially laminating on the high refractive index layer. The refractive index of the low refractive index layer is from 1.20 to 1.55. A preferable refractive index thereof is from 1.30 to 1.50. Preferably, the low refractive index layer is formed as the outermost layer having abrasion resistance and protection properties against dirt. As measures to significantly improve abrasion resistance, assignment of slip properties to the surface is effective. Conventionally known measures, such as a thin film layer formed by introduction of silicone, introduction of fluorine, and the like, can be used. The refractive index of a fluorine-containing compound is preferably from 1.35 to 1.50. More preferably, it is from 1.36 to 1.47.

The thickness of the low refractive index layer is preferably from 30 to 200 nm, more preferably from 50 to 150 nm, and most preferably from 60 to 120 nm.

[Other Layers of the Antireflection Film]

A hard-coat layer, a forward scattering layer, a primer layer, an antistatic layer, an undercoat, a protective layer, and the like may be further provided.

(Hard-Coat Layer)

The hard-coat layer is provided on the transparent substrate in order to give physical strength to the antireflection film. Particularly preferably, the hard-coat layer is provided between the transparent substrate and the high refractive index layer.

The hard-coat layer is preferably formed by a crosslinking reaction or polymerization reaction of a compound curable by light and/or heat.

As a curable functional group, photopolymerizable functional groups are preferable. As an organometallic compound containing a hydrolytic functional group, organic alkoxysilyl compounds are preferable. Examples of these compounds include the same compounds as those exemplified in the case of the high refractive index layer. A specific configuration composition of the hard-coat layer includes those described in Japanese Patent Application Laid-Open Nos. 2002-144913 and 2000-9908, and WO 00/46617, for example.

The high refractive index layer can serve also as the hard-coat layer. In such a case, preferably, the hard-coat layer is formed by minutely dispersing particulates obtained by using the method described in the case of the high refractive index layer to contain the particulates in the hard-coat layer. The hard-coat layer can serve also as the anti-glare layer (mentioned later) in which particles having an average particle size of 0.2 to 10 μm are contained and anti-glare function (anti-glare function) is given. The thickness of the hard-coat layer can be appropriately designed according to application. The thickness of the hard-coat layer is preferably 0.2 to 10 μm, and more preferably 0.5 to 7 μm. In the pencil hardness test in accordance with JIS K5400, strength of the hard-coat layer is preferably not less than H, more preferably not less than 2 H, and most preferably not less than 3 H. Moreover, in a Taber test in accordance with JIS K5400, a smaller amount of wear of a test piece before and after the test is more preferable.

(Forward Scattering Layer)

A forward scattering layer is provided in order to give an effect of improving the viewing angle when a visual angle is inclined in four directions of upward, downward, left, and right directions in application to the liquid crystal display. The forward scattering layer can have also the hard-coat function when particulates having different refractive indexes are dispersed in the above-mentioned hard-coat layer. Examples of the forward scattering layer include: those described in Japanese Patent Application Laid-Open No. 11-38208 where a coefficient of forward scattering is specified; those described in Japanese Patent Application Laid-Open No. 2000-199809 where the relative refractive index of a transparent resin and fine particles are within a specified range; and those described in Japanese Patent Application Laid-Open No. 2002-107512 wherein a haze value of not less than 40% is specified.

(Anti-Glare Function)

The antireflection film may have anti-glare function to scatter external light. The anti-glare function is obtained by forming unevenness on the surface of the antireflection film. In the case where the antireflection film has the anti-glare function, a haze of the antireflection film is preferably from 3 to 30%, more preferably from 5 to 20%, and most preferably from 7 to 20%. Any method can be used as a method for forming unevenness on the surface of the antireflection film as long as the shape formed on the surface can be held fully. For example, other than the manufacturing method of the multilayer film according to the present invention, examples of such a method include a method for forming unevenness in a film surface of the low refractive index layer using particulates (for example, Japanese Patent Application Laid-Open No. 2000-271878); a method for adding a small amount (0.1 to 50% by mass) of relatively large particles (particle size of 0.05 to 2 μm) to form a film having surface unevenness in a lower layer of a low refractive index layer (a high refractive index layer, a middle refractive index layer, or a hard-coat layer), and maintaining these shapes to provide the low refractive index layer on the lower layer (for example, Japanese Patent Application Laid-Open Nos. 2000-281410, 2000-95893, 2001-100004, and 2001-281407); and a method for physically transferring an unevenness on the surface after coating a top layer (a protection layer against dirt) (for example, embossing described in Japanese Patent Application Laid-Open Nos. 63-278839, 11-183710, and 2000-275401).

An example in which the present invention is applied to an antireflection film is mainly described in the present embodiment, but the present invention will not be limited to this. The present invention can also be applied to a technique for producing optical functional film sheets such as antireflection films, polarizing plates, and optical compensation films, functional films containing a heat sensitive developing agent, nano particles, and the like, separator films for fuel cells, magnetic recording tapes containing a magnetic agent, adhesive tapes, and barrier films, for example. The substrate may be any material into which only a solvent for forming a multilayer film is allowed to permeate.

EXAMPLES

Next, Examples of the process for production of a functional film according to the present invention will be described to show that the solute material A having functionality can be unevenly distributed in the film surface by satisfying the above-mentioned inequality A or inequality B.

First, as a preliminary examination, a coating liquid for which the relationship of the above-mentioned inequality A or inequality B was satisfied was actually prepared. A monolayer of the coating liquid was applied onto the transparent substrate 18, and the applied coated layer 29 was dried to produce a functional film.

As Comparative Examples, a coating liquid for which the relationship of the above-mentioned inequality A or inequality B was not satisfied was prepared. Coating and drying of the transparent substrate 18 were similarly conducted to produce a functional film.

As the transparent substrate 18, a triacetyl cellulose film (FUJITAC, made by Fujifilm Corporation, and a thickness of 80 μm) was used. An acrylic monomer (functional material) as the solute material A, and a cellulose based polymer was used as the solute material B.

In Comparative Examples, in order to change the diffusion coefficient of the solute material B, cellulose based polymers whose structure and molecular weight were individually changed were synthesized. Methyl ethyl ketone (MEK) was used for a solvent.

Then, the main diffusion coefficients and the cross diffusion coefficients of the solute material A and the solute material B were measured with the Raman method mentioned above.

The main diffusion coefficient of the solute material A in Example was $3.2 \times 10^{-10}$ m2/s, and the cross diffusion coefficient thereof was $1.0 \times 10^{-11}$ m2/s. Moreover, the main diffusion coefficient of the solute material B was $4.5 \times 10^{-10}$ m2/s, and the cross diffusion coefficient thereof was $1.5 \times 10^{-11}$ m2/s. Thereby, in Examples, both of the inequality A and the inequality B are satisfied.

On the other hand, in Comparative Examples, the same solute material A as that in Examples was used, and the structure and molecular weight of the solute material B were changed. Thereby, the main diffusion coefficient was $2.5 \times 10^{-10}$ m2/s, and the cross diffusion coefficient was $0.8 \times 10^{-11}$ m2/s. As a result, in Comparative Examples, neither the inequality A nor the inequality B is satisfied.

Then, at the coating liquid preparation step 12, a coating liquid in which the solute material A, the solute material B were mixed with the solvent C in the following weight ratio was prepared. Next, at the application step 14, the coating liquid was applied at a thickness (wet film thickness) of 10 μm with a wire bar type coater while the transparent substrate 18 was conveyed at a conveying velocity of 20 m/min. Next, at the drying step 16, the applied coated layer 29 was dried at an atmosphere temperature of 25° C. to solidify the coated layer 29.

(Coating Liquid Composition)

| | |
|---|---|
| Solute material A | 10 parts by weight |
| Solute material B | 10 parts by weight |
| Solvent C | 80 parts by weight |

Then, cross sections of the coated layers 29 after drying, which were obtained in Examples and Comparative Examples, were measured using an Electron Spectroscopy for Chemical Analysis (ESCA), and among the solute materials A and B that form the coated layer 29, an uneven distribution proportion of the solute material A unevenly distributed in the coating layer surface was examined. The uneven distribution proportion of the solute material A was represented by solute material A/(solute material A+solute material B). In the case of measurement with the ESCA, the uneven distribution proportion in the coating layer surface of not more than approximately 10 nm in a film depth direction is measured.

As a result, it turned out that in the functional film produced with the coating liquid of Examples in which at least one of the inequality A and the inequality B are satisfied, a larger amount of the solute material A is unevenly distributed in the film surface in an uneven distribution proportion of 0.58. On the other hand, it turned out that in the functional film produced with the coating liquid of Comparative Examples in which the inequality A or the inequality B is not satisfied, the uneven distribution proportion of the solute material A in the film surface is 0.46, and a larger amount of the solute material B is unevenly distributed in the film surface.

In order to analyze the above-mentioned test result in detail and prove the present invention in a generalized form, a drying simulation was used as follows. The reason for having used the drying simulation is that it is actually difficult to produce the solute material B (the material for Examples) in which the inequality A or the inequality B is satisfied at a plurality of levels and the solute material B (the material for Comparative Examples) in which the inequality A or the inequality B is not satisfied at a plurality of levels by synthesis, and that the present invention can also be proved through the following drying simulation.

A drying theory mentioned in detail in Document 4 shown below was used for the fundamental model of the drying simulation. However, Document 4 mainly develops the theory in the two-component system. Accordingly, the theory needs to be extended to the three-component system, and Document 5 shown below was referred to about extension to the three-component system. As the three-component system, Document 5 defines a Solvent, a Non-solvent, and a Polymer, Solvent=good solvent and Non-solvent=poor solvent, and one polymer and two solvent systems are included. A similar theory can be developed by defining the Non-solvent as a solute. A difference is that in the case where the poor solvent is defined as the solute, no vaporization at a gas liquid interface occurs.

Constitutive equations along with boundary conditions of mass transfer in the three-component system created based on Document 4 and Document 5 and heat transfer equations were solved using general-purpose FEM software COMSOL Multiphysics (COMSOL AB, Sweden). A method for incorporating heat transfer calculation is described in detail in Document 6 shown below. By reference, the equations related to the present invention are selected and shown in FIG. 6 among the constitutive equations of mass transfer in the three-component system described in Document 5 and the heat transfer equations described in Document 6. See to the documents for description of the equations. The basic constitutive equation is as in FIG. 6. However, the constitutive equation will not be limited to the above-mentioned example if appropriate components are applied to components 1, 2, and 3 of three components, respectively.

Document 4 . . . Vrentas, J. S., Vrentas, C. M., "Drying of Solvent-Coated Polymer Films," J. Poly. Sci.: Part B: Poly. Phys., Vol. 32, 187 (1994).

Document 5 . . . Dabaral, M., Francis, L. F., and Scriven, L. E., "Drying Process Paths of Ternary Polymer Solution Coating," AIChE Journal, Vol. 48, No. 1, 25 (2002).

Document 6 . . . Price, P. E., Cairncross, R. A., "Optimization of Single-Zone Drying of Polymer Solution Coatings Using Mathematical Modeling," J. of Applied Poly. Sci., Vol. 78, 149 (2000).

In addition, parameters necessary for calculation are as follows. A subscript A designates the solute material A, a subscript B designates the solute material B, and a subscript C designates the solvent C. Each of the parameters was handled in the same manner as in Documents 4 to 6.

Mass transfer coefficient $kg=4\times10^{-3}$ m/s; heat transfer coefficient of the liquid film surface and the bottom surface of the substrate=100 J/(m2sK); liquid film thickness at an early stage of drying=100 μm; interaction parameter $XAB=XAC=XBC=0.4$; specific volumes $VA=8.33\times10^{-4}$ m3/kg, $VB=8.33\times10^{-4}$ m3/kg, and $VC=1.24\times10^{-3}$ m3/kg; initial volume fraction $\Phi A0=\Phi B0=0.1$; initial solvent concentration of 754 kg/m3; amount of the solvent molecules of $72.1\times10^{-3}$ kg/mol; thermal conductivity of the solvent of 0.13 J/(msK); specific heat at constant pressure of the solvent of $2.19\times10^3$ J/(kgK); latent heat of vaporization of the solvent of $4.33\times10^5$ J/(kgK); and thickness of the transparent substrate of 80 μm. The temperature of the film and the atmosphere at the time of drying was 25° C.

Then, the amount of the solute material A and that of the solute material B in the film surface after drying were determined from the result of the drying simulation, and the uneven distribution proportion of the solute material A unevenly distributed in the film surface was calculated. Namely, as shown in Table of FIG. 7, the uneven distribution proportion of the solute material A (functional material) in the film surface after drying was determined and evaluated in the case where the inequality A or the inequality B is satisfied and in the case where neither the inequality A nor the inequality B is satisfied. It was evaluated that it is more desirable as a higher proportion of the solute material A having functionality is unevenly distributed in the film surface.

Figure 7:
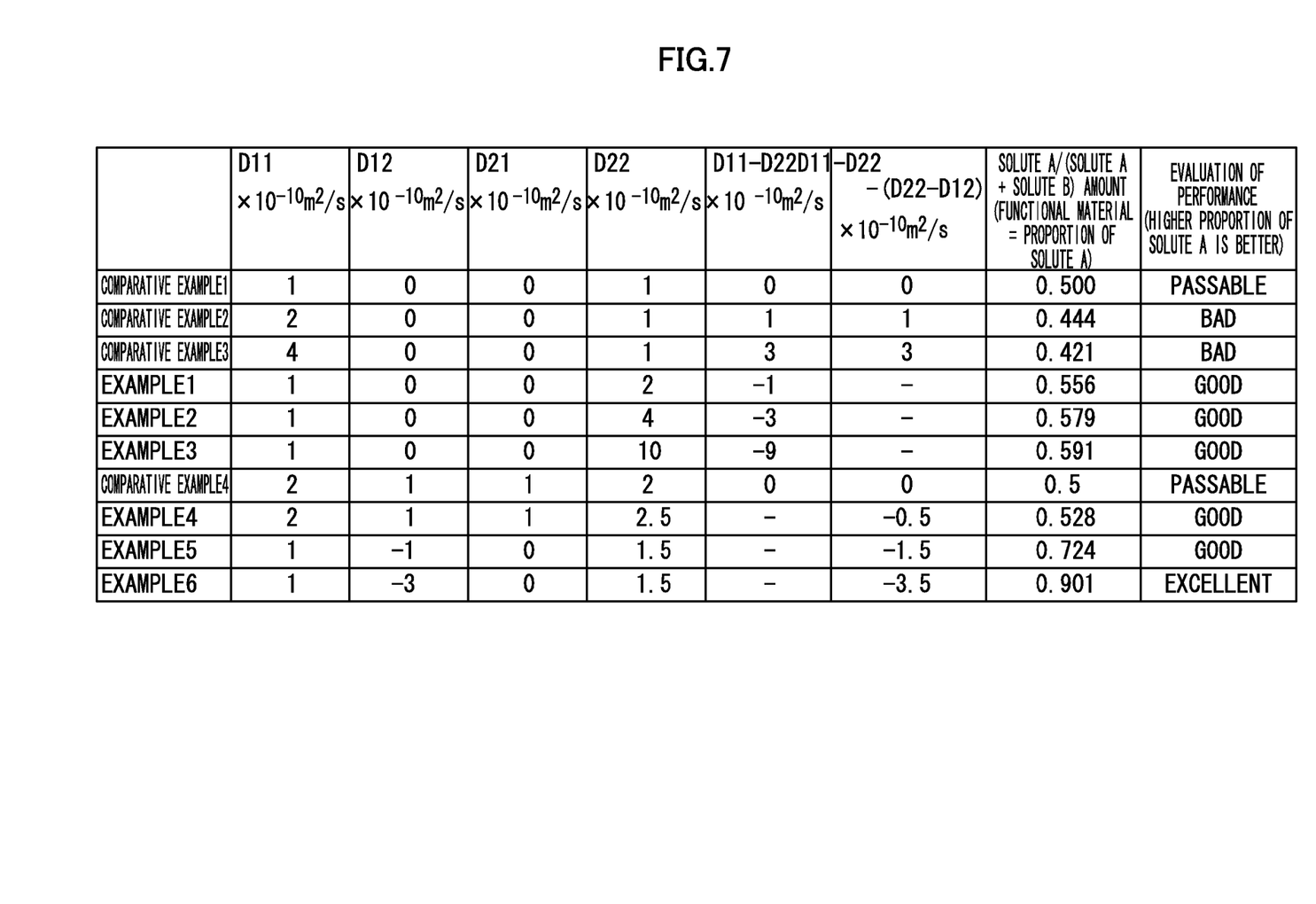
FIG. 7 is a table showing results of the present invention performed by the drying simulation.

In the evaluation of Table in FIG. 7, the case where no solute material A is unevenly distributed on the film surface side and the substrate side is "passable," the case where the solute material A is unevenly distributed on the film surface side is "good," and the case where the solute material A is unevenly distributed on the transparent substrate side is "bad." Moreover, the case where a higher proportion of the solute material A is unevenly distributed in the film surface is "excellent."

As a result, as shown in Table of FIG. 7, in Comparative Examples 1 and 4 when the main diffusion coefficients of the solute material A and the solute material B are the same, the uneven distribution proportion of the solute material A is 0.5, and no solute material A is unevenly distributed on the film surface side and the substrate side (evaluation is "passable").

On the other hand, in Examples 1 to 3 in which the inequality A is satisfied, the uneven distribution proportion exceeds 0.5, and it turns out that the solute material A is unevenly distributed in the film surface (evaluation is "good") although there is a difference in a degree of uneven distribution. Particularly, Examples 2 and 3 in which the difference of $D11-D22$ is less than $-3$ had a value of the uneven distribution proportion larger than that of Example 1, and showed a good result.

On the other hand, in Comparative Examples 1 to 4 in which the inequality A is not satisfied, the uneven distribution proportion is not more than 0.5, and it turns out that the solute material A is unevenly distributed on the transparent substrate side (evaluation is "bad") although there is a difference in a degree of uneven distribution.

Moreover, looking at the case of the inequality B where the cross diffusion coefficient as well as the main diffusion coefficient of FIG. 7 are considered, in Comparative Examples 1 and 4 where the difference $(D11-D21)$ in which the cross diffusion coefficient of the solute material B is subtracted from the main diffusion coefficient of the solute material A is the same as the difference $(D22-D12)$ in which the cross diffusion coefficient of the solute material A is subtracted from the main diffusion coefficient of the solute material B, the uneven distribution proportion of the solute material A is 0.5, and no solute material A is unevenly distributed on the film surface side and the substrate side (evaluation is "passable").

However, in Examples 4 to 6 in which the inequality B is satisfied, the uneven distribution proportion exceeds 0.5, and it turns out that the solute material A is unevenly distributed in the film surface (evaluation is "good") although there is a difference in a degree of uneven distribution. Particularly, Example 5 in which a difference of $(D11-D21)-(D22-D12)$ is $-1.5$ has an uneven distribution proportion of 0.724 and shows a good result. An uneven distribution proportion at a difference of $-3.5$ is 0.901, and the uneven distribution proportion is extremely large (evaluation is "excellent").

Moreover, comparing the inequality A with the inequality B, it turns out that a degree of uneven distribution of the solute material A in the coating layer surface is larger to when the inequality B is satisfied.

The invention claimed is:

1. A process for production of a functional film, comprising the steps of:
 a coating liquid preparation step of preparing a coating liquid;
 an application step of applying a single layer of the prepared coating liquid onto a substrate; and
 a drying step of drying the applied coated layer;
 wherein
 at the coating liquid preparation step,
 a plurality of solute materials are contained in at least one solvent; and
 when D11 is a main diffusion coefficient of a solute material having functionality of the plurality of solute materials and D22 is a main diffusion coefficient of the other solute material, the other solute material is selected so that an inequality A $D11<D22$ is satisfied; and
 at the drying step, the solute material having functionality is unevenly distributed from top to bottom in the film surface.

2. The process for production of a functional film according to claim 1, wherein the solute material having functionality is a monomer or a polymer.

3. The process for production of a functional film according to claim 2, wherein a difference between the diffusion coefficients represented by D11-D22 is not more than −3.

4. The process for production of a functional film according to claim 1, wherein a difference between the diffusion coefficients represented by D11-D22 is not more than −3.

5. A process for production of a functional film, comprising the steps of:
- a coating liquid preparation step of preparing a coating liquid;
- an application step of applying a single layer of the prepared coating liquid onto a substrate; and
- a drying step of drying the applied coated layer;

wherein
at the coating liquid preparation step,
a plurality of solute materials are contained in at least one solvent; and
when D11 and D12 are a main diffusion coefficient and a cross diffusion coefficient of a solute material having functionality of the plurality of solute materials, respectively, and D22 and D21 are a main diffusion coefficient and a cross diffusion coefficient of the other solute material, respectively, the other solute material is selected so that an inequality B(D11-D21)<(D22-D12) is satisfied; and
at the drying step, the solute material having functionality is unevenly distributed from top to bottom in the film surface.

6. The process for production of a functional film according to claim 5, wherein the solute material having functionality is a monomer or a polymer.

7. The process for production of a functional film according to claim 6, wherein a difference between the diffusion coefficients represented by (D11-D21)−(D22-D12) is not more than −1.5.

8. The process for production of a functional film according to claim 5, wherein a difference between the diffusion coefficients represented by (D11-D21)−(D22-D12) is not more than −1.5.

9. A process for production of a functional film, comprising the steps of:
- a coating liquid preparation step of preparing a coating liquid;
- an application step of applying a single layer of the prepared coating liquid onto a substrate; and
- a drying step of drying the applied coated layer;

wherein
at the coating liquid preparation step,
a plurality of solute materials are contained in at least one solvent; and
when D11 is a main diffusion coefficient of a solute material having functionality of the plurality of solute materials and D22 is a main diffusion coefficient of the other solute material, the other solute material is selected so that an inequality A D11<D22 is satisfied; and
at the drying step,
the coated layer which is applied to the substrate to form the single layer in the application step is dried at a drying speed where the coated layer is not solidified before a diffusion movement for unevenly distributing a solute material having functionality in the coated layer on the coated layer surface is not advanced, and
the solute material having functionality is unevenly distributed from top to bottom in the film surface by the coating liquid preparation step and the drying step.

10. A process for production of a functional film, comprising the steps of:
- a coating liquid preparation step of preparing a coating liquid; an application step of applying a single layer of the prepared coating liquid onto a substrate; and
- a drying step of drying the applied coated layer;

wherein
at the coating liquid preparation step,
a plurality of solute materials are contained in at least one solvent; and
when D11 and D12 are a main diffusion coefficient and a cross diffusion coefficient of a solute material having functionality of the plurality of solute materials, respectively, and D22 and D21 are a main diffusion coefficient and a cross diffusion coefficient of the other solute material, respectively, the other solute material is selected so that an inequality B(D11-D21)<(D22-D12) is satisfied; and
at the drying step,
the coated layer which is applied to the substrate to form the single layer in the application step is dried at a drying speed where the coated layer is not solidified before a diffusion movement for unevenly distributing a solute material having functionality in the coated layer on the coated layer surface is not advanced, and
the solute material having functionality is unevenly distributed from top to bottom in the film surface by the coating liquid preparation step and the drying step.

* * * * *